United States Patent [19]
Stolz et al.

[11] Patent Number: 5,655,422
[45] Date of Patent: Aug. 12, 1997

[54] TOOL HEAD FOR USE IN MACHINE TOOLS

[75] Inventors: Gerhard Stolz, Ingersheim; Gerhard Scheer, Loechgau, both of Germany

[73] Assignee: Komet Praezisionswerkzeuge Robert Breuning GmbH, Besigheim, Germany

[21] Appl. No.: 331,666

[22] PCT Filed: Apr. 30, 1993

[86] PCT No.: PCT/EP93/01047
§ 371 Date: Nov. 3, 1994
§ 102(e) Date: Nov. 3, 1994

[87] PCT Pub. No.: WO93/22090
PCT Pub. Date: Nov. 11, 1993

[30] Foreign Application Priority Data
May 4, 1992 [DE] Germany ............... 42 14 337.3

[51] Int. Cl.$^6$ ............... B23Q 17/22; B23B 25/06
[52] U.S. Cl. ............... 82/1.2; 408/11; 409/208
[58] Field of Search ............... 29/56.5; 82/1.2, 82/131; 408/181, 179, 11, 16, 147, 152, 153; 409/208, 232, 215, 234

[56] References Cited

U.S. PATENT DOCUMENTS 4,067,251  1/1978  Eckle et al. ............... 82/1.2
4,676,704  6/1987  Donnini et al. ............... 409/208
5,251,511  10/1993  Muendlein ............... 82/1.2

Primary Examiner—William R. Briggs
Attorney, Agent, or Firm—Flynn, Thiel, Boutell & Tanis, P.C.

[57] ABSTRACT

A tool head for use in machine tools has an adjustable slide (18) capable of moving with respect to the base body (10) transversely to its axis of rotation (12) and of being provided with a tool holder, as well as a device (30) for direct measurement of the travel of the slide (18). The measurement device (30) has two substrate plates (32, 34) upon whose facing surfaces are arranged the capacitive measurement structures of a measuring scale and of a sensor. The substrate plates (32, 34) are arranged in eccentric tangential planes parallel to the axis of rotation. The radially inner substrate plate is surface-linked to a bearing surface of the slide (18), whereas the radially outer substrate plate is surface-supported by the bearing surface (62), capable of forming a support after surface material removal, of a bearing strip (56) that can be detachably inserted into a radial window cutout (54) of the base body (10, 36).

40 Claims, 9 Drawing Sheets

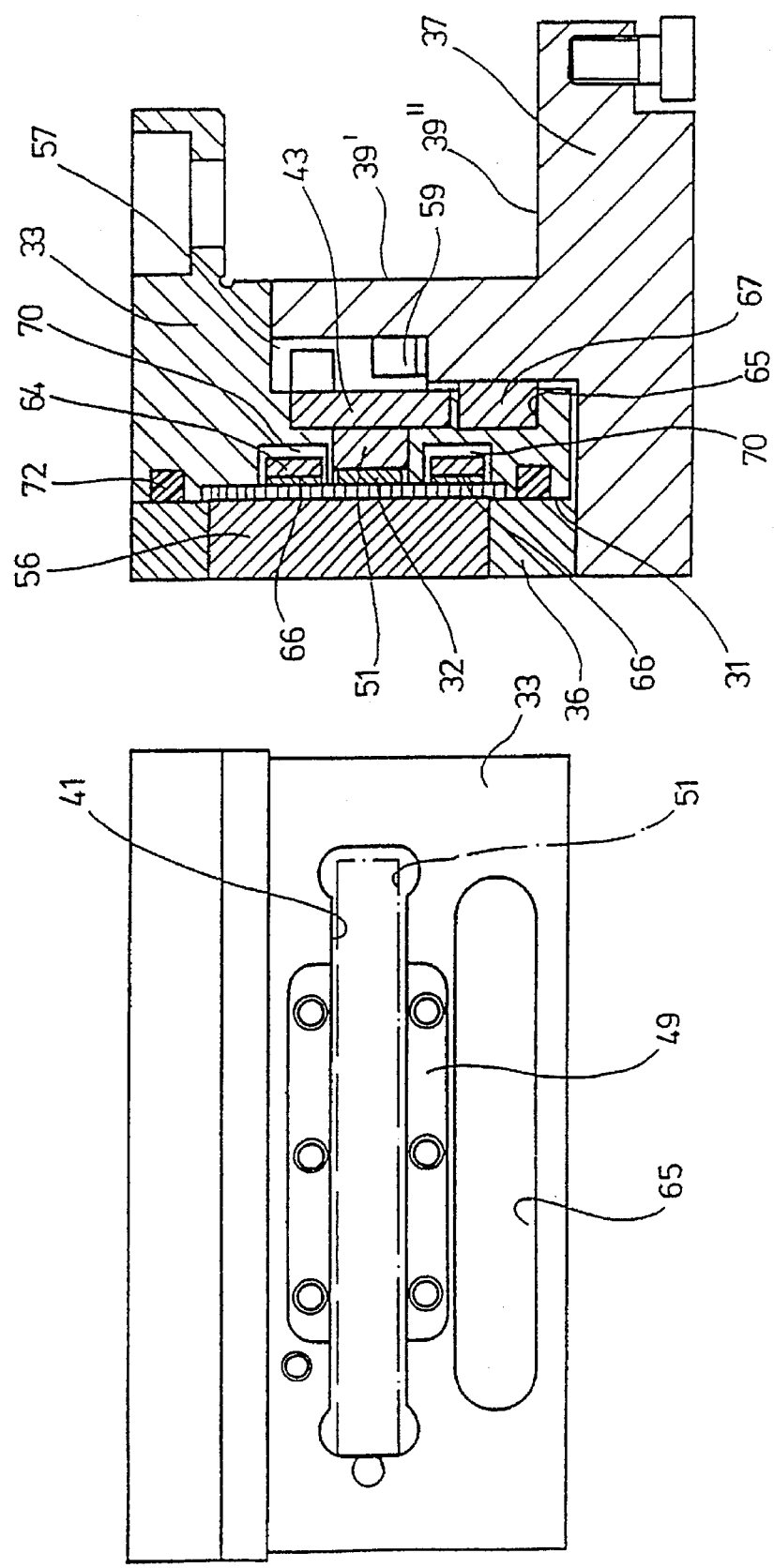

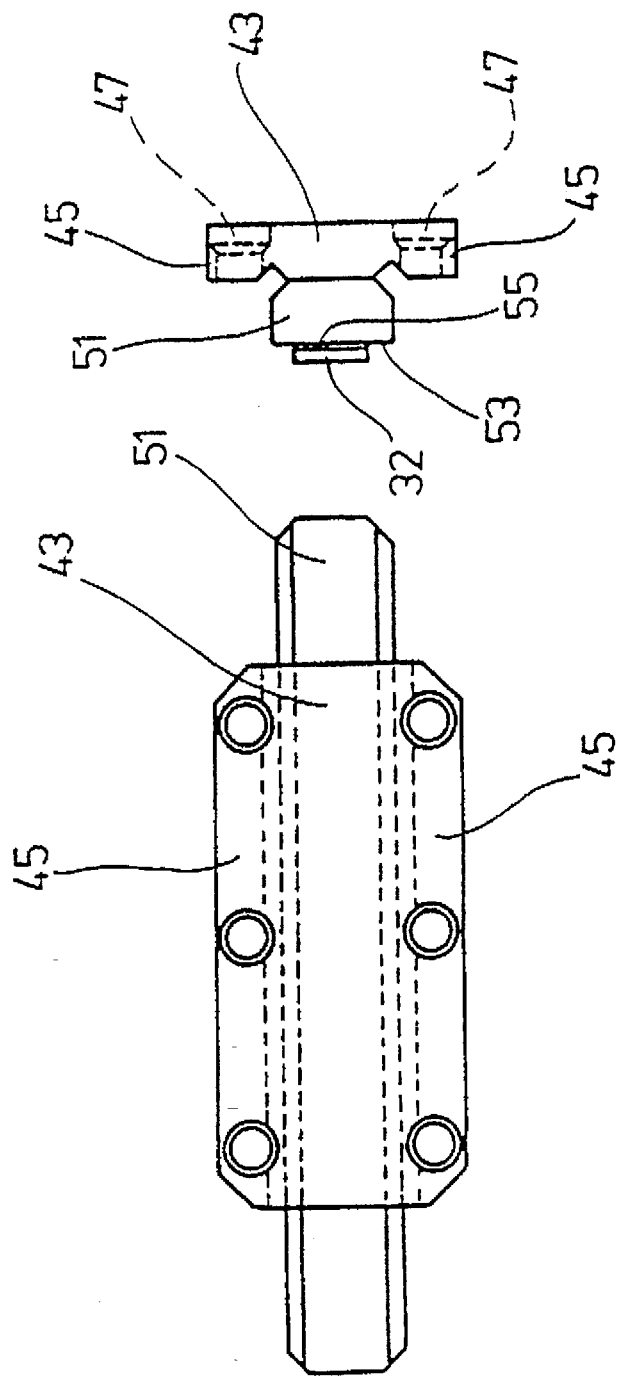

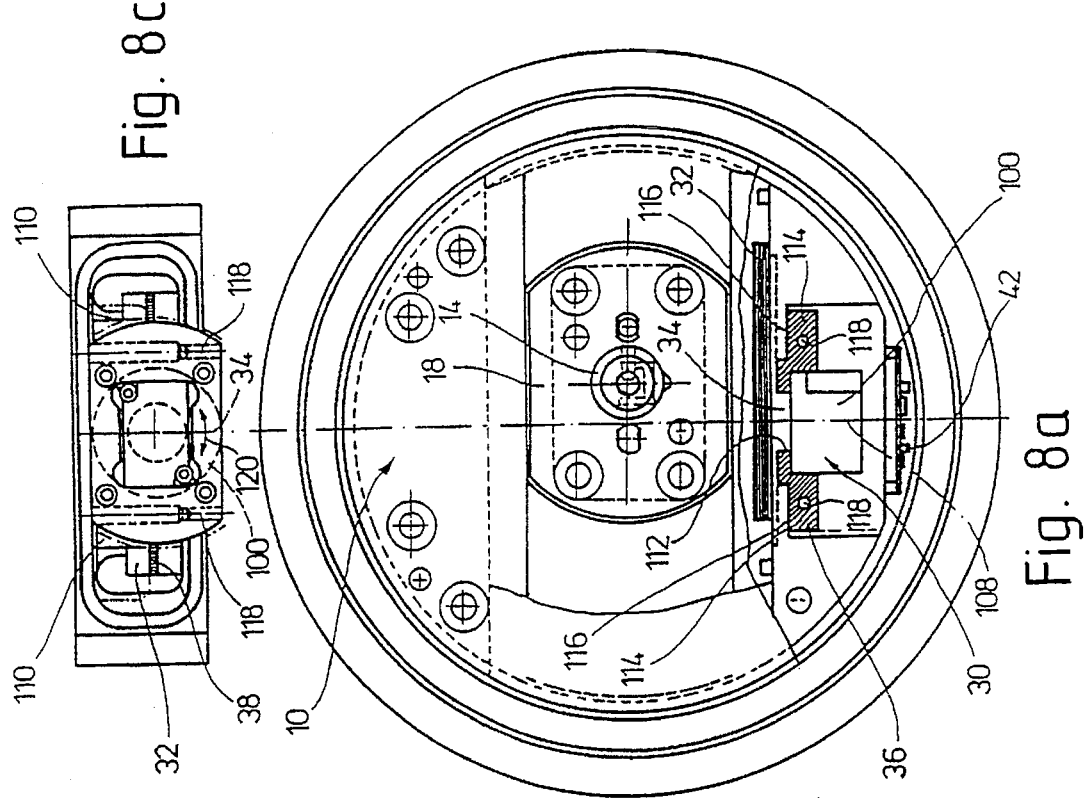
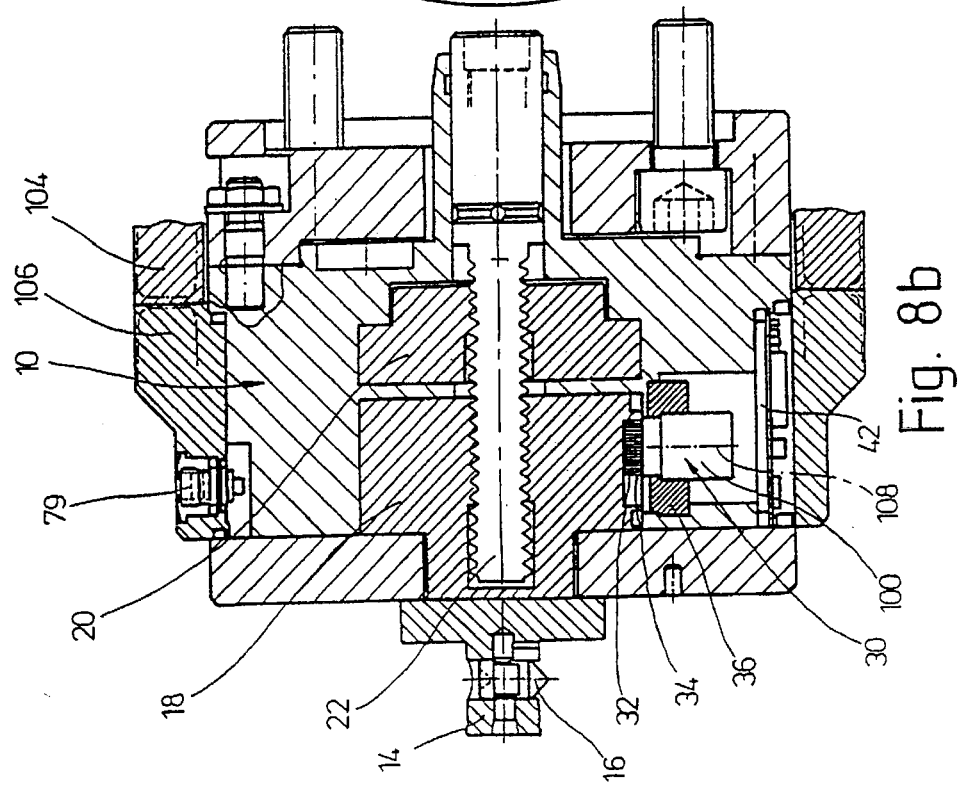

TOOL HEAD FOR USE IN MACHINE TOOLS

FIELD OF THE INVENTION

The invention relates to a tool head for use in machine tools, having a main body rotating about a rotational axis, having at least one slide, which is adjustable relative to the main body, preferably transversely to the rotational axis, and can be armed with at least one cutting tool or a tool carrier, having a device, comprising a measuring scale and a sensor, for directly measuring the path of adjustment of the slide relative to the main body, and having evaluating electronics for the evaluation or display of the path-measurement findings, the measuring scale and the sensor being disposed, in the form of measuring structures, in such a way on a surface of a respective flat substrate plate connected to the slide and main body respectively, which substrate plate is preferably made of glass, ceramics or metal, that the surfaces exhibiting the measuring structures are aligned in displacement planes which are separated from one another by a gap and run parallel to one another.

BACKGROUND OF THE INVENTION

A tool head of this type is known (WO91/03345), in which those surfaces of the substrate plates exhibiting the capacitive measuring structures are disposed in centrifugally neutral arrangement, in the direct proximity of the rotational axis, in planes running perpendicular to the rotational axis. The first substrate plate is herein flatly connected, by its surface opposing the measuring structure and pointing axially outwards, to a bearing face of the slide, whilst the second substrate plate is stuck, by its surface exhibiting the measuring structure, against two mutually spaced mounting strips, the measuring structure being left free, which mounting strips are fastened, by their free ends projecting over the edge of the substrate plate, to an axially aligned mounting face of the main body, whilst the substrate plate engages in a central recess in this mounting plate. The effect of this fastening method is that that surface of the substrate plate which bears the measuring structure lies exactly flush with the mounting face of the main body. This arrangement is only however possible if the substrate plates are disposed in centrifugally neutral arrangement. There are however tool designs in which, because of central built-in elements, for example, a centrifugally neutral arrangement of the substrate plates is not possible. In the case of an eccentric arrangement of the substrate plates, the known measures, because of the centrifugal forces acting upon the substrate plates, cannot be adopted. Added to this is the fact that, especially in the use of ceramic substrate plates, measurement tolerances of ±100 μm in the wall thickness can occur, which, in the previously known arrangement, cannot be readily compensated, considering that the gap width between the active surfaces of the substrate plates, in capacitive measuring structures, must necessarily measure only 10 to 20 μm.

SUMMARY OF THE INVENTION

Starting from this prior art, the object of the invention is to develop a tool head of the type defined in the introduction, which, despite an eccentric arrangement of the substrate plates bearing the measuring structures, enables the path of adjustment to be exactly measured and tolerances to be equalized.

The solution according to the invention is based upon the notion that those surfaces of the substrate plates which exhibit the measuring structures are disposed in eccentric tangential planes running parallel to the rotational axis, that the radially inner substrate plate is connected, by its surface opposing the measuring structure and pointing radially inwards, to a bearing structure on the slide side, that the radially outer substrate plate is supported by a bearing structure on the main body side, and that the bearing structure on the slide and/or main body side is formed by a surface segment of the slide or main body, which surface segment can be matched by surface coating or surface abrasion on the basis of the gap width and/or plane-parallelism to be set.

Alternatively, it is also possible for those surfaces of the substrate plates exhibiting the measuring structures to be disposed in eccentric radial planes running perpendicular to the rotational axis, for the one substrate plate to be connected to a bearing structure on the slide side and the other substrate plate to a bearing structure on the main body side, and for the bearing structure on the slide and/or main body side to be formed by a surface segment of the slide or main body, which surface segment can be matched by surface coating or surface abrasion on the basis of the gap width and/or plane-parallelism to be set.

An advantageous embodiment of the invention envisages that the measuring scale and the sensor are disposed in the form of capacitive measuring structures on the surfaces of the substrate plates. In contrast, the measuring scale and the sensor can also be disposed in the form of incremental measuring structures on the substrate plates. Expediently, the substrate plate on the sensor side is herein a component part of an optoelectronic scanning head of an incremental measuring device.

The bearing structure advantageously exhibits a bearing face to which that surface of the substrate plate in question opposing the measuring structure is flatly connected.

Advantageously, the bearing structure is herein a component part of a bearing strip which is detachably insertable into a radial window cutout in the slide or main body or in a substrate carrier which can be rigidly connected to the slide or main body.

According to an advantageous embodiment of the invention, the radially inner substrate plate is connected to the bearing face with the aid of an adhesive coating, preferably consisting of a "one-second bonding agent". The elastic adhesive coating enables different temperature expansions of the ceramic carrier substrate and of the metallic slide to be equalized.

Advantageously, the radially inner substrate plate is disposed in a recess in the slide, which recess is open radially outwards. The substrate plate in question can thus be disposed with its surface bearing the measuring structure, in relation to an adjacent sliding and displacement plane of the slide, countersunk in the recess. This is an essential precondition for enabling substrate plates which are surface-contacted on the measuring structure side, as are obtained in photochemical production, also to be used, without any risk of collision with the sliding and displacement faces. For design reasons, it has proved to be particularly advantageous if the bearing face or the window cutout for the reception of the bearing strip is disposed on a preferably angular substrate carrier which can be detachably fastened to the slide, and if the slide, in a region disposed radially within the radially inner substrate plate and its adjacent sliding and displacement face, is supported and guided, by lateral faces which point radially outwards and axially oppose the cutting tool or tool carrier, on a thrust guide part fixed to the main body. The radially outward pointing sliding and displacement face of the substrate carrier does not herein assume, therefore, a guide function for the slide. Since the slide in the main body regularly requires lubrication, though the measuring structures on the substrate plates must be kept free from a lubricant inlet, it is advantageous if, in the region of the sliding and displacement face of the slide or base plate, there is disposed a groove for the reception of a circumferential sealing ring, which groove embraces the substrate plates over the entire path of displacement of the slide. The sealing ring is herein expediently configured as a scraper ring, in particular a square ring. In order to be able to absorb the reaction forces transmitted via the sealing ring to the substrate carrier, the substrate carrier advantageously bears, on its side opposing the substrate plate, a sliding and supporting strip, preferably made from hard metal, which bears radially against a radially outward pointing slide face of the main body, in particular in the region of the thrust guide part.

According to a further advantageous embodiment of the invention, between the substrate body and the thrust guide part there is disposed an interspace, extending in the direction of displacement, for the reception of a drag connection for connecting cables of the radially inner substrate plate, which connecting cables are connected to the main body and the evaluating electronics. It has further proved expedient for the window cutout for the reception of the bearing strip for the radially outer substrate plate to be likewise disposed in a substrate carrier which can be detachably fastened to the main body. In order to facilitate fitting, the substrate carriers can be introduced, with prefitted bearing strips and substrate plates, jointly into an axially accessible interspace between main body and slide and can be fastened to the latter. The handling of the cables to be connected to the evaluating electronics is facilitated if in the region of the window cutout there is disposed a cable duct, leading between the substrate carrier and bearing strip from the bearing face to the back of the substrate carrier, for the reception of those connecting wires or lugs leading from the side of the measuring structures of the substrate plates to the evaluating electronics.

For the running smoothness and machining accuracy of the tool head, it has proved to be particularly advantageous if the slide, on its side diametrically opposing the substrate carrier, additionally bears a mass-balance body corresponding to the substrate carrier.

A preferred embodiment of the invention envisages that the radially outer substrate plate, in loose bearing contact with its bearing face, is pressed against the bearing face under the influence of elastomerically sprung clamping members. In order to clamp in place the substrate plate in question, there are advantageously provided two mutually spaced, tab-like clamping members, which overlap the window cutout on the side of the substrate plate, are preferably lined with an elastomer and, in the region of their free ends, can be screwed to the main body.

The matchable bearing face is herein able to be formed by a platform which projects in a step-shape against the bearing strip, whilst the bearing strip can be fastened, by flanges molded laterally onto the projecting platform, in a step-shaped marginal recess in the window cutout of the main body and slide respectively.

By using a suitable fitting aid, the radially inner substrate plate can be exactly aligned in relation to the adjacent sliding and displacement plane of the slide, both in the radial direction and in the direction of displacement, in the course of being fastened to the slide. The necessary tolerance equalization is expediently effected, via the radially outer substrate plate, by measurement and surface abrasion of the associated bearing strip in the region of its bearing face. The bearing face, depending upon the tolerances to be equalized, can consequently be disposed in the window cutout in countersunk, flush or projecting arrangement in relation to the adjacent sliding and displacement plane of the main body. Since the radially inner substrate plate is disposed in its slide recess in preferably countersunk arrangement, the radially outer substrate plate is disposed, with its surface bearing the measuring structure, in preferably projecting arrangement in relation to the adjacent sliding and displacement face. For the reception of projecting parts of the radially outer substrate plate and of the clamping members, additional recesses, which are open radially outwards, are expediently provided in the sliding and displacement plane of the slide.

It has further proved to be advantageous if the substrate plate bearing the measuring scale is disposed on the slide and the substrate plate bearing the sensor is disposed on the main body.

A preferred embodiment of the invention envisages that the slide is displaceable by means of an externally operated drawbar aligned axially in the main body, the drawbar being able to exhibit as transmission means at least one helical gearing, which engages in a helical gearing of the slide and is complementary thereto. A slide adjustment of this kind is already known per se (DE-C-26 08 930) in respect of facing and boring heads. In the main body there is expediently provided there a further mass-balance slide, which is displaceable by means of the drawbar, in relation to the first slide, in the opposite direction.

According to a further advantageous embodiment of the invention, the evaluating electronics are connected by an optoelectronic transmitter-receiver for data exchange, which transmitter-receiver is preferably disposed in a peripheral ring of the tool head, to an external transmitting-receiving device. It is thereby possible, via a CNC-control system which is connected up to the external transmitting-receiving device on the one hand and to a drive mechanism for the drawbar on the other hand, to move and position the slide of the tool head in the direction of a CNC-axis.

The evaluating electronics, like the electronics of the transmitter-receiver, are disposed in the peripheral ring, which preferably consists of light metal. The peripheral ring can herein be sealed and/or screened against the main body, preferably by a circumferential metal foil. For fastening purposes, the peripheral ring is advantageously clamped between a flange cover and an annular shoulder of the main body, circumferential sealing rings disposed at the frontal ends of the peripheral ring being clamped in-between.

The evaluating electronics in the tool head can be battery-operated. Particularly advantageous, however, is an inductive energy-transfer and data-transfer path between the measuring and evaluating device disposed in the rotary tool head and an external control device. The inductive energy and data coupling means that the battery can be omitted. The energy and data coupling herein expediently operates in the radio-frequency range, the data-exchange expediently being modulated to the carrier frequency formed by the energy supply. The inductive energy supply also allows the slide to be motor-controlled within the tool head, which is not readily possible under battery operation.

In the case of incremental measurement of the path of displacement, the scanning head is expediently clamped in place in a bearing plate fastened to the main body or slide and, together with the bearing plate, is pivotable and adjustable, in relation to the opposing substrate plate configured as a measuring scale, about an axis running perpendicular to the plane of the substrate plate.

BRIEF DESCRIPTION OF DRAWINGS

The invention is explained in greater detail with reference to some illustrative embodiments represented diagrammatically in the drawing, in which:

FIG. 1b shows an enlarged detail from FIG. 1a;

FIG. 2a shows an axial section through the facing head according to FIG. 1a;

FIG. 2b shows an enlarged detail from FIG. 2a;

FIGS. 5a and 5b show a top view and a cross-section (in the installation state) of the substrate carrier on the slide side;

FIGS. 6a and 6b show a top view and an end-face view of the bearing strip for the substrate carrier according to FIG. 5;

FIG. 8a shows a top view of a facing head which is modified in relation to FIG. 1a, in partially broken-open representation;

FIG. 8b shows an axial section through the facing head according to FIG. 8a; and FIG. 8c shows a top view of the slide in the direction of the arrow X of FIG. 8a.

DETAILED DESCRIPTION

Figure 1A:
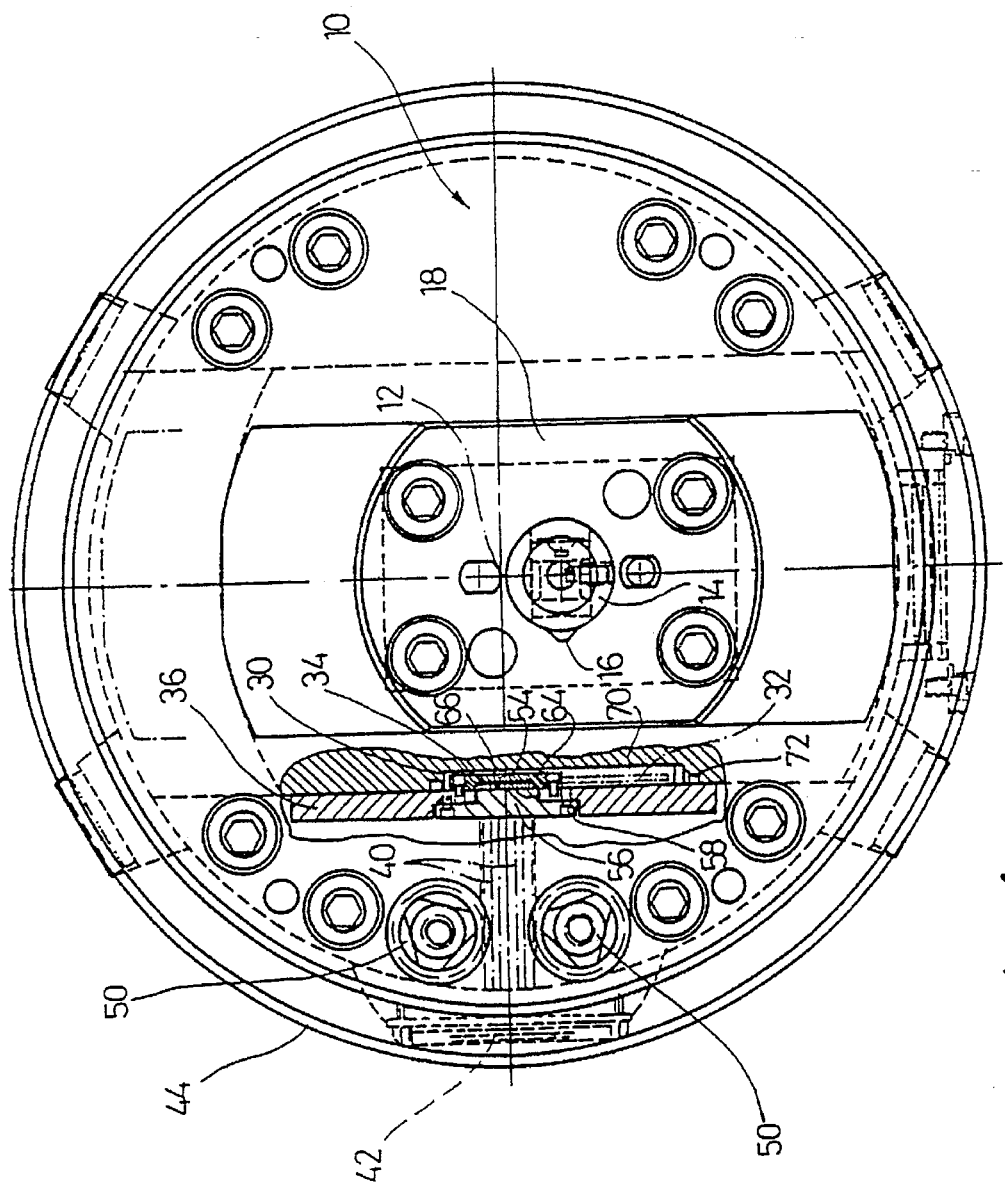
FIG. 1a shows a top view of a facing head in partially broken-open representation.

The tool heads represented in the drawing are intended as facing and boring heads for use in machine tools. The tool head essentially comprises a main body 10, which is rotatable about a rotational axis 12, a working slide 18, which is displaceable in the main body 10 transversely to the rotational axis 12, exhibits a locating journal 14 having tightening bolts 16 for the connection of a tool carrier and is displaceable in the main body 10 transversely to the rotational axis 12, and an equalizing slide 20, which is displaceable in the main body 10 in the opposite direction of the working slide 18. The working slide 18 and equalizing slide 20 are actuated via an externally displaceable drawbar 22, which is engaged, with its mutually diametrically opposing helical gearings 24, with complementary helical gearings 26, 28 of the working slide 18 and of the equalizing slide 20. The helical gearings 26, 28 of the working slide 18 and of the equalizing slide 20 are oppositely inclined at the same angle, whilst the drawbar 22 exhibits two intersecting, oppositely inclined helical gearings. The effect of this measure is that, upon displacement of the drawbar 22, the working slide 18 and the equalizing slide 20 are displaced to opposite sides.

The path of displacement of the working slide 18 can be measured using a capacitive or incremental path-measuring device 30 disposed in the interior of the tool head between the working slide 18 and main body 10.

The capacitive measuring device 30 according to FIGS. 1 to 6 essentially comprises two substrate plates 32, 34 made from ceramic material, of which the one, radially inner substrate plate 32 is connected to the working slide 18 and the other, radially outer substrate plate 34 to a substrate carrier 36 fixed to the main body. The substrate plates 32, 34 bear, on their mutually facing surfaces, a capacitive measuring structure 38, which is preferably applied photochemically. The measuring structure of the substrate plate 32 connected to the working slide 18 is herein configured as a measuring scale, whilst the measuring structure 38 of the substrate plate 34 connected to the main body 10 operates as a sensor. The measuring structures 38 of the substrate plates 32, 34 are connected via leads 40 to evaluating electronics 42, which are disposed in a peripheral housing 46 of the tool head, which peripheral housing is limited by an aluminum ring 44. The supply of current to the evaluating electronics 42 and to further electronic assemblies is here effected by means of batteries 48, which are disposed in battery compartments 50 in the main body 10.

Figure 1B:
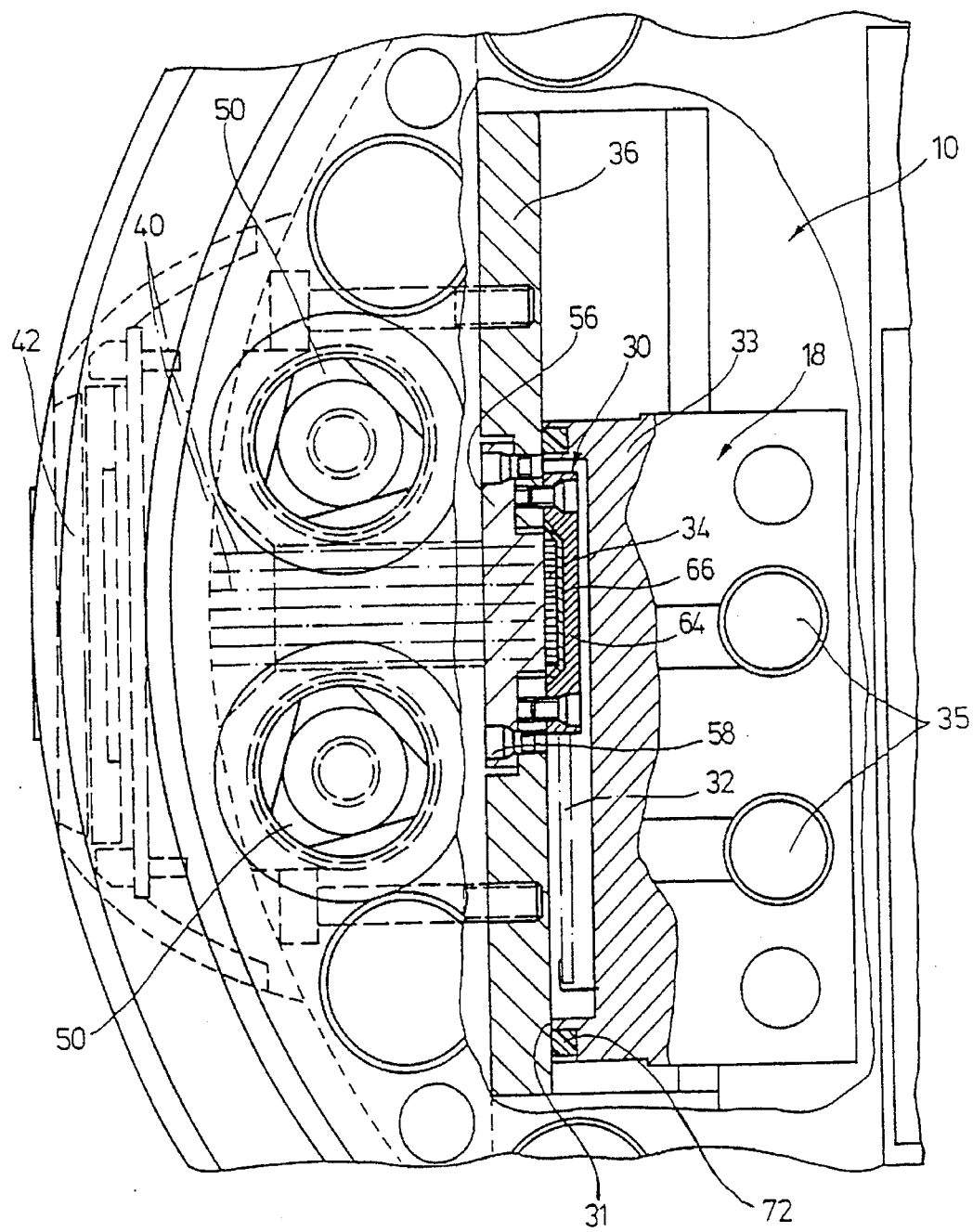
Figure 2A:
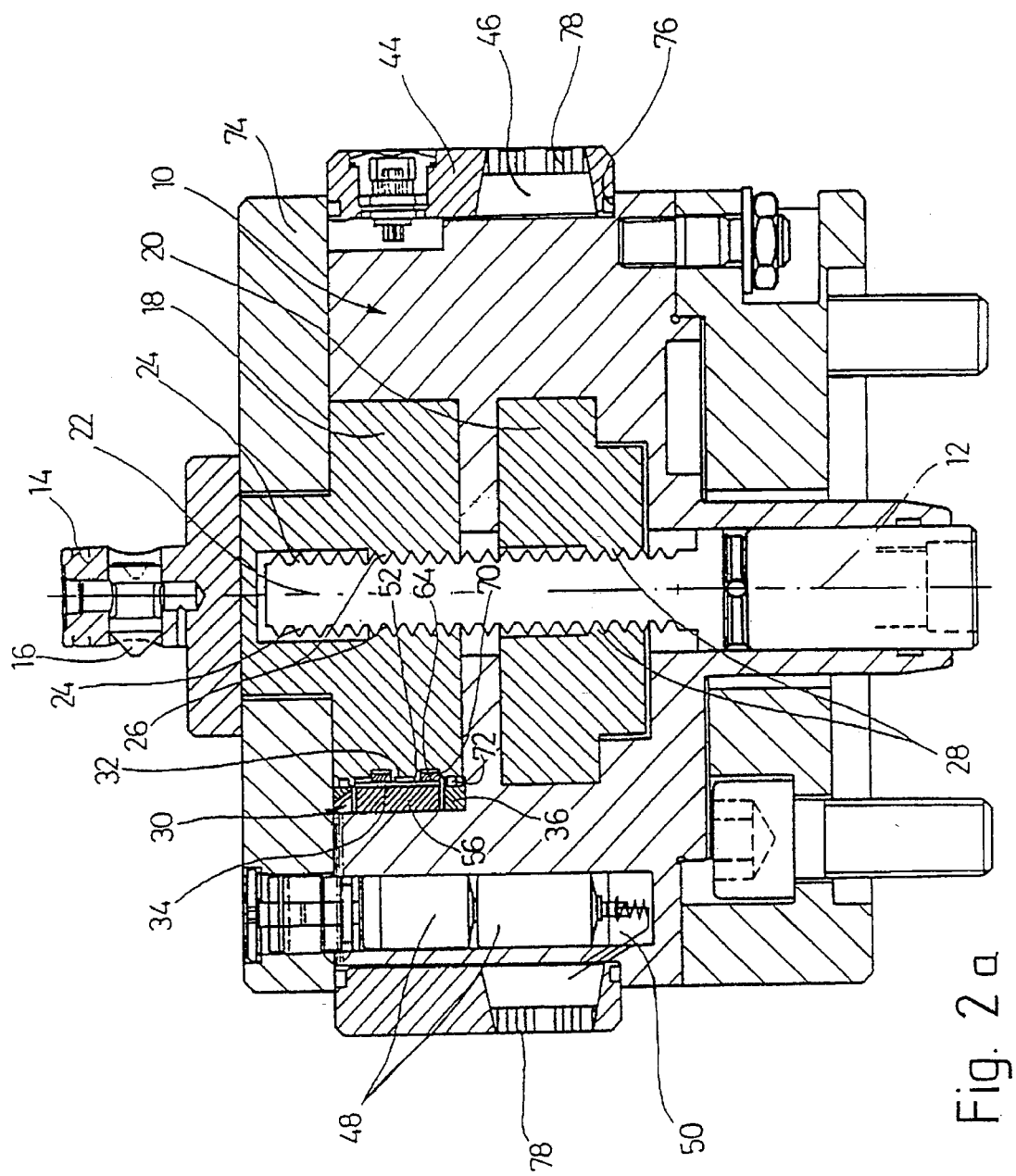
Figure 2B:
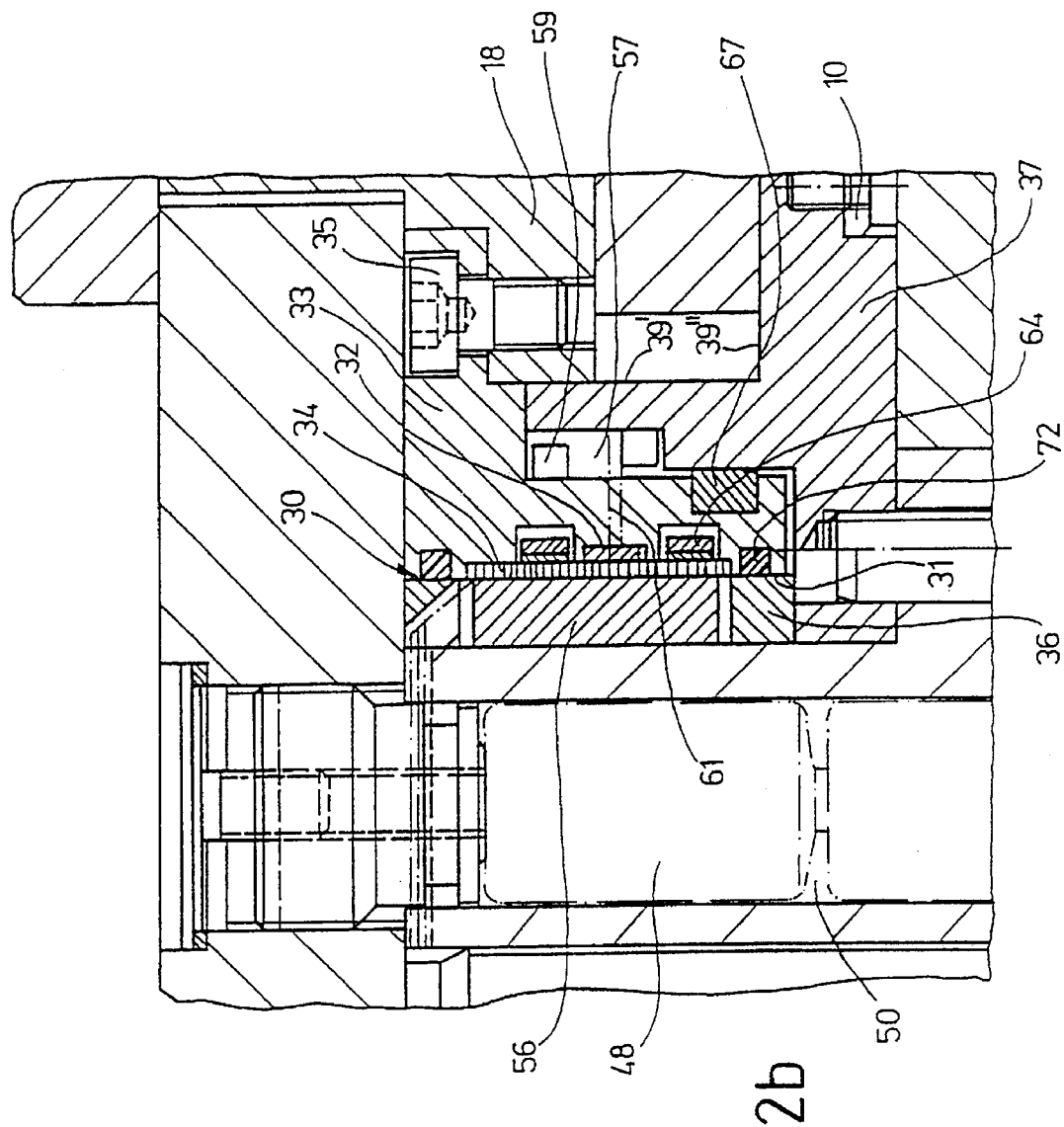
Figures 4A, 4B:
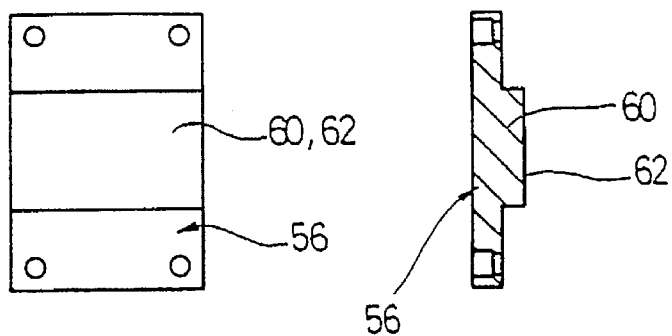
FIGS. 4a and 4b show a top view and a longitudinal section of the bearing strip on the main body side.
Figures 3A, 3B:
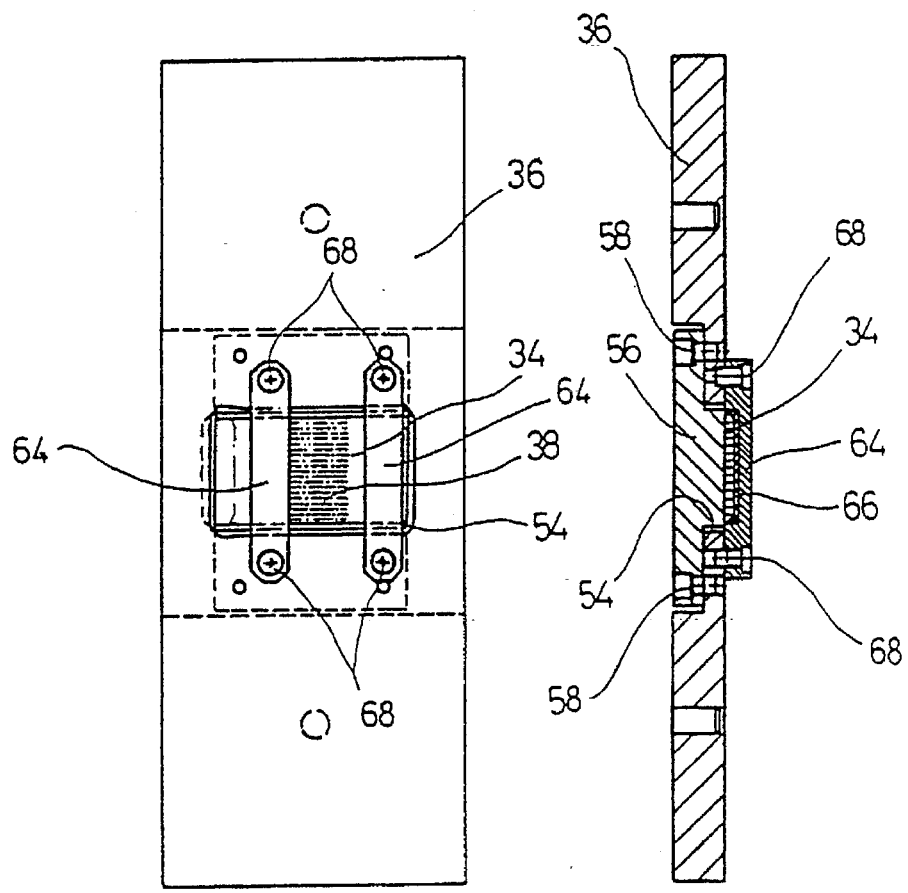
FIGS. 3a and 3b show a top view and a longitudinal section of the substrate carrier on the main body side.

As can be seen from FIGS. 1b, 2b and 5b, the substrate plate 32 on the slide side is disposed on the radially outward pointing sliding and displacement face 31 of an angular substrate carrier 33, which is connected rigidly to the slide 18 by means of axially aligned screws 35. The slide 18 is guided in the direction of displacement in a thrust guide part 37, to be precise in the region of the guide faces 39' and 39", which thrust guide part is essentially U-shaped in cross section and is fixed to the main body. The substrate carrier 33 on the slide side exhibits a window opening 41 passing through radially, into which a bearing strip 43 of step-shaped configuration is inserted radially from the inside and is fastened to the flange parts 45, by means of screws 47, in the step-shaped marginal region 49 belonging to the window opening 41. The bearing strip 43 exhibits on its plate part 51, which projects in the manner of a platform, a bearing face 53, which points radially outwards through the window opening 41 and to which the substrate plate 32 on the slide side is fastened with the aid of an adhesive coating 55. The bearing face 53 can be matched by surface abrasion (grinding), for the setting of the necessary plane-parallelism, to the mutually opposing substrate plates. Between the substrate carrier 33 and the thrust guide part 37, an interspace 57 is hollowed out, in which the connecting cables 61 of the substrate plate 32 on the slide side are guided, by means of a cable-dragging device 59, to the evaluating electronics 42 disposed on the main body side. In order to balance the moment of inertia, a balance body (not represented in the drawing) is located on that side of the working slide 18 diametrically opposing the substrate body 33.

For the positioning of the radially outer substrate plate 34, the substrate carrier 36 fixed to the main body exhibits a window cutout 54, into which a bearing strip 56 of step-shaped configuration is inserted radially from the outside and is fastened by means of screws 58. The bearing strip 56 exhibits on its plate part 60, which projects in the manner of a platform, a bearing face 62 for the substrate plate 34, which bearing face points radially inwards through the window cutout 54 and can be matched in its height, by surface abrasion, such that a gap of 10 to 20 µm is left between the two substrate plates 32 and 34. The substrate plate 34 is placed, with its surface opposing the measuring structure 38 and pointing radially inwards, onto the bearing face 62 of the fitted bearing strip 56 and is pressed against the bearing face 62 by means of two mutually spaced tabs 64, which are lined with elastomeric material 66 and are fastened by means of screws 68 to the substrate carrier 36 fixed to the main body. In the working slide 18, additional cutouts 70 are provided, in which the tabs projecting over the substrate carrier 36 fixed to the main body engage.

A circumferential square-ring seal 72, which surrounds, on the side of the slide, the entire region of the path-measuring device 30, ensures that the lubricating oil is scraped out of the slide guide when the slide is displaced and cannot get into the inner region of the measuring device 30. The sealing forces transferring, via the seal 72, to the substrate carrier 33 on the slide side are transmitted via the supporting and sliding strip 67, made of hard metal, which is supported on the outer side of the thrust guide part 37 and is disposed in the groove 65 of the substrate body 33.

The aluminum ring 44 forming the peripheral housing 46 is clamped in a seal-tight manner between a flange cover 74 and an annular shoulder 76 of the main body. The aluminum ring 44 further contains a plurality of window openings 78, disposed in scattered arrangement in the peripheral direction, for the accommodation of transmitting and receiving elements for infrared radiation, which are electrically connected to transmitting and receiving electronics disposed in the peripheral housing 46. By means of the transmitting and receiving elements, infrared light can be sent and received all the way round, even in the case of a fast-rotating tool head.

In the aluminum ring 44 there is additionally located an interface 79, connected to corresponding electronics, for serial communication or data-exchange with an external computer.

Figure 7:
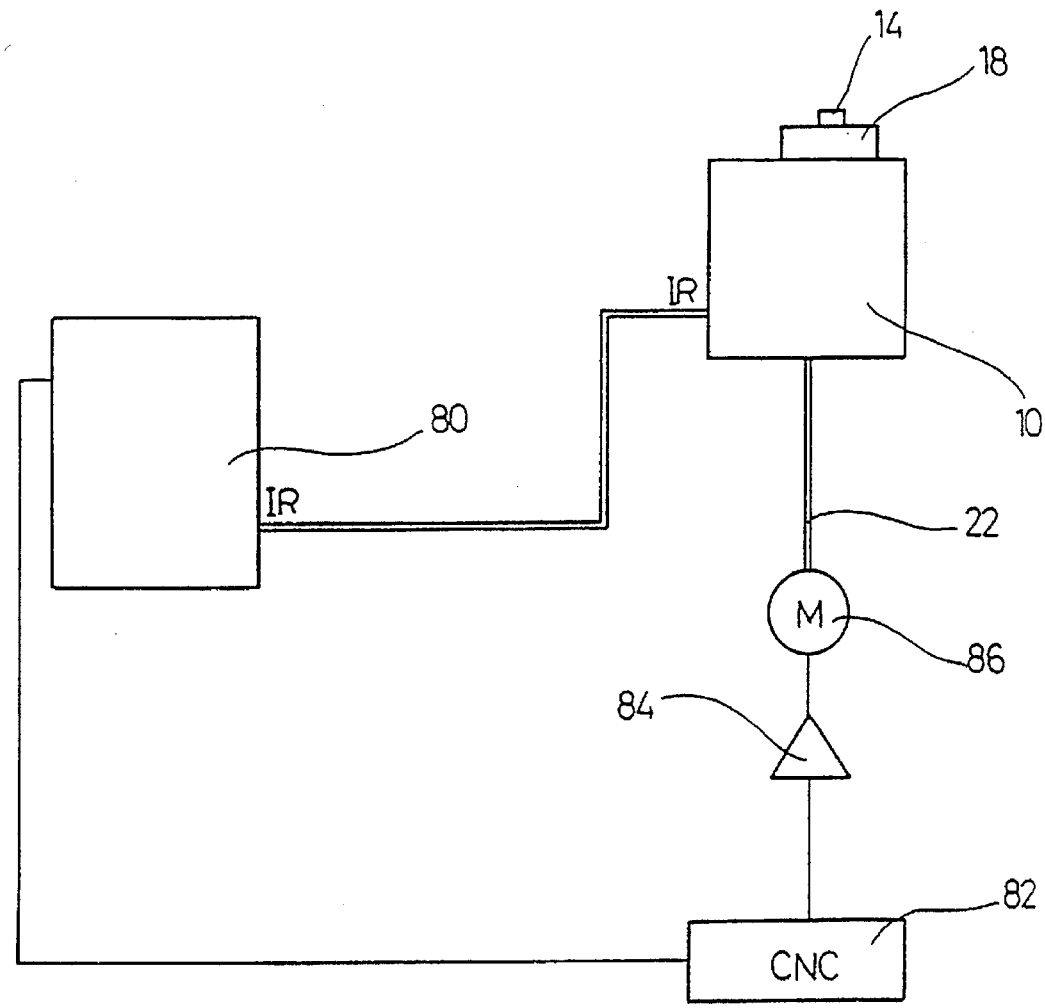
FIG. 7 shows a diagram of a CNC-control system for controlling the slide motion of the facing head.

The communication with the electronics disposed in the tool head is effected via an external transmitting and receiving device 80 for infrared radiation, which, for its part, can be connected to a CNC-control system 82, where appropriate with the interposition of adapting electronics for coordinating the data-exchange. It is thereby possible, using the CNC-control system 82, a servo amplifier 84 and a motor 86 actuating the drawbar 22, to move and position the working slide 18 of the tool head, by virtue of an NC-program, in the direction of a CNC-axis (FIG. 7).

In the illustrative embodiment shown in FIGS. 8a to c, there is provided an incremental path-measuring device 30 for directly determining the path of adjustment of the working slide 18, which path-measuring device exhibits a radially inner substrate plate 32, which is connected to the working slide 18 and is configured as an incremental scale, and an optoelectronic scanning head 100, which is connected to a substrate carrier 36 fixed to the main body. The scanning head exhibits, on its side facing the substrate plate 32, a window 34 having an incremental measuring structure, which is imaged in an optoelectronic ray path onto the measuring structure 38 of the scale 32 and is converted within the scanning head into an electronic output signal. The electronic output signal is evaluated in the evaluating electronics 42, a path-measuring signal being created.

As can be seen from FIG. 8a, the supply of current to the evaluating electronics 42 is effected via an inductive energy-coupling system, comprising a machine-fixed stator coil 104 and a toolhead-fixed rotor coil 106. The data-transfer from the evaluating electronics to an external control system and evaluating system is effected, likewise inductively, via the rotor coil 106 and the stator coil 104, to be precise by modulating the data signals to the carrier frequency of the current supply. The stator coil 104 disposed on the machine side is expediently of annular or segment-shaped configuration and is disposed, around the machine spindle, on the headstock (not represented). The rotor coil 106 can be disposed directly on the tool head or on an intermediate flange disposed between tool head and spindle and electrically connected to the tool head.

The scanning head 100 is disposed on the substrate carrier 36 configured as a flange plate, which substrate carrier exhibits an aperture 112 for the measuring window 34 and a flange protrusion 114 for fastening to the main body. The setting of the gap width between the window 34 of the scanning head 100 and the substrate plate 32 is effected by material coating and abrasion in the region of the matching face 116 between the flange protrusion 114 and the associated stop face on the main body. For the fine-adjustment of the scanning head 100, this is adjustable in the flange plate 36, about its axis 108, in relation to the incremental measuring structure 38 of the scale substrate plate 32, which adjustment is effected by means of adjusting screws 118 in the direction of the double arrow 120. It is basically feasible also to carry out an alignment of the scanning head about at least one of the two axes running perpendicular to the axis 108, for example in a ball joint (not represented). In a corresponding design of the scanning head, in place of a separate flange plate 36, the housing of the scanning head having a molded-on flange protrusion 114 for direct fastening to the main body can also be provided.

As can be seen from FIG. 8c, the substrate plate 32 is clamped to the working slide 18 by means of clamping jaws 110 and is surrounded by a circumferential square-ring seal 72.

The embodiment shown in FIGS. 8a to c can also basically be modified to the effect that the scanning head is aligned not radially, but axis-parallel to the main body. In this case, the scale-substrate plate 32 should be disposed on the working slide through 90° in relation to the illustrative embodiment according to FIGS. 8a to c.

In summary, the following should be stated: the invention relates to a tool head for use in machine tools, having a slide 18, which is adjustable relative to the main body 10 transversely to its rotational axis 12 and can be armed with a tool carrier, and having a device 30 for directly measuring the path of adjustment of the slide 18. The measuring device 30 exhibits two substrate plates 32, 34, on whose mutually facing surfaces there are disposed capacitive measuring structures of a measuring scale and of a sensor. The substrate plates 32, 34 are disposed, according to the invention, in eccentric tangential planes running parallel to the rotational axis, the radially inner substrate plate being flatly connected to a bearing face of the slide 18, whilst the radially outer substrate plate is flatly supported by a bearing face 62, which is supportable by surface abrasion, of a bearing strip 56 which can be detachably inserted into a radial window cutout 54 in the main body 10, 36.

The embodiments of the invention in which an exclusive property or privilege is claimed are defined as follows:

1. A tool head for use in machine tools, comprising a main body rotating about a rotational axis, at least one slide adjustable relative to the main body transversely to the rotational axis and carries thereon at least one cutting tool, a first bearing structure being positioned on a side of the main body, a second bearing structure being positioned on a side of the slide, a measuring structure means including a measuring scale and a sensor for directly measuring a path of adjustment of the slide relative to the main body, and including evaluating electronics for effecting evaluation or display of a result of the path measurements, a pair of flat substrate plates, a respective one of the measuring scale and the sensor being disposed on a surface of a respective one of the flat substrate plates connected to the first and second bearing structures positioned on the main body and the slide, respectively, so that the surfaces having the measuring structures are aligned in displacement planes which are separated from one another by a gap and extend parallel to one another, the substrate plates being made of at least one of glass, ceramics and metal, the surfaces of the substrate plates which have the measuring structures are disposed in eccentric tangential planes extending parallel to the rotational axis, wherein one of the substrate plates is oriented radially inwardly of the other radially outer substrate plate, the radially inner substrate plate being connected so that its surface opposes the measuring structure and faces radially inwards to the first bearing structure, wherein the radially outer substrate plate is supported by the second bearing structure, and wherein at least one of the first and second bearing structures has a surface segment having a surface area which is alterable by at least one of surface coating applied thereto and surface removing abrasion means for setting a gap width of the gap and a plane parallel relationship between the measuring scale and the sensor.

2. A tool head for use in machine tools, comprising a main body rotating about a rotational axis, at least one slide adjustable relative to the main body transversely to the rotational axis and carries thereon at least one cutting tool, a first bearing structure being positioned on a side of the main body, a second bearing structure being positioned on a side of the slide, a measuring structure means including a measuring scale and a sensor for directly measuring a path of adjustment of the slide relative to the main body, and including evaluating electronics for effecting evaluation or display of a result of the path measurements, a pair of flat substrate plates, a respective one of the measuring scale and the sensor being disposed on a surface of a respective one of the flat substrate plates connected to the first and second bearing structures positioned on the main body and the slide, respectively, so that the surfaces having the measuring structures are aligned in displacement planes which are separated from one another by a gap and extend parallel to one another, the substrate plate being made of at least one of glass, ceramics and metal, the surfaces of the substrate plates which have the measuring structures are disposed in radial planes extending perpendicular to the rotational axis, wherein a first one of the pair of substrate plates is connected to the first bearing structure, wherein a second one of the pair of substrate plates is supported by the second bearing structure, and wherein at least one of the bearing structures has a bearing face to which a surface of the respective first and second substrate plate opposite the measuring structure is flatly connected, the bearing face being alterable by at least one of a surface coating and surface removing abrasion means for setting one of a gap width of the gap and a plane parallel relationship between the measuring scale and the sensor.

3. The tool head as claimed in claim 1, wherein the measuring scale and the sensor are disposed in the form of capacitive measuring structures on the surfaces of the substrate plates.

4. The tool head as claimed in claim 1, wherein the measuring scale and the sensor are disposed in the form of incremental measuring structures on the substrate plates.

5. The tool head as claimed in claim 1, wherein the second substrate plate is a component part of an optoelectronic scanning head of an incremental measuring device.

6. The tool head as claimed in claim 1, wherein each of the first and second bearing structures has a bearing face to which the surface of the respective substrate plate opposing the measuring structure is flatly connected.

7. The tool head as claimed in claim 6, wherein each of the bearing structures has a bearing strip which is detachably insertable into a radial window cutout in one of the slide, the main body and a substrate carrier which is rigidly connected to one of the slide and main body, respectively.

8. The tool head as claimed in claim 6, wherein the radially inner substrate plate is connected the bearing face with the aid of an adhesive coating.

9. The tool head as claimed in claim 1, wherein the radially inner substrate plate is disposed in a recess in the slide, which recess is open radially outwards.

10. The tool head as claimed in claim 9, wherein the radially inner substrate plate is disposed with the surface thereof having the measuring structure relation to an adjacent sliding and displacement plane of the positioned thereon is countersunk in the recess.

11. The tool head as claimed in claim 7, wherein at least one of the bearing face and the window cutout for the reception of the bearing strip on a side facing the slide is disposed on an angular substrate carrier which is detachably fastened to the slide, wherein the slide has an adjacent sliding and displacement face in a region disposed radially inwardly from the side of the substrate plate facing the slide and guide faces which point radially outwards and axially oppose the cutting tool or tool carrier, and wherein a thrust guide part is fixed to the main body, the thrust guide part receives the guide faces thereon.

12. The tool head as claimed in claim 11, wherein the substrate carrier on the side facing the slide supports, on a side opposing the substrate plate, a sliding and supporting strip, which is adapted to press radially against a radially outward pointing slide face of the main body in the region of the thrust guide part.

13. The tool head as claimed in claim 11, wherein an interspace is positioned between the substrate carrier and the thrust guide part extending in the direction of displacement of the slide, for the reception of a drag connection means for connecting cables of the radially inner substrate plate, which connecting cables are connected to the evaluating electronics positioned on the main body.

14. The tool head as claimed in claim 7, wherein the slide, on a side diametrically opposite the substrate carrier, has an equalizing body corresponding to the substrate carrier.

15. The tool head as claimed in claim 7, wherein the window cutout for the reception of the bearing strip for the radially outer substrate plate is disposed in a substrate carrier which can be detachably fastened to the main body.

16. The tool head as claimed in claim 15, wherein the substrate carriers are positioned, with one of pre-fitted bearing strips and clamping jaws with substrate plates, jointly into an axially accessible interspace between the main body and the slide, and are fastenable to the slide.

17. The tool head as claimed in claim 7, wherein in the region of the window cutout there is disposed a cable duct, leading between the substrate carrier and bearing strip from the bearing face to the back of the substrate carrier, for the reception of those connecting cables leading from a side of the measuring structures of the substrate plates to the evaluating electronics.

18. The tool head as claimed in claim 6, wherein elastomerically sprung clamping members press the radially outer substrate plate, which is in loose bearing contact with the bearing face, against the bearing face.

19. The tool head as claimed in claim 7, wherein the bearing face is defined by a platform which projects in a step-shape against the bearing strip.

20. The tool head as claimed in claim 19, wherein the bearing strip can be fastened, by flange parts molded laterally onto the projecting platform, in a step-shaped marginal recess in the window cutout.

21. The tool head as claimed in claim 7, wherein there are provided two mutually spaced, tab-like clamping members, which overlap the window cutout on the side of the radially outer substrate plate, are lined with an elastomer and further comprising a fastener means for fixing the clamping members in the region of free ends of the clamping members, to the main body.

22. The tool head as claimed in claim 7, wherein the bearing face is disposed in the window cutout in one of a countersunk, a flush and a projecting arrangement in relation to an adjacent sliding and displacement plane of the main body.

23. The tool head as claimed in claim 11, wherein the angular substrate carrier supporting the radially outer substrate plate has a sliding and displacement face facing radially inward, and wherein the radially outer substrate plate is disposed, with a surface of the radially outer substrate supporting the measuring structure in a projecting arrangement in relation to the adjacent sliding and displacement face.

24. The tool head as claimed in claim 23, wherein in the sliding and displacement face of the slide there are disposed further recesses, which are open at the edge thereof in the direction of the main body, for the reception of projecting parts of the radially outer substrate plate and of the clamping members.

25. The tool head as claimed in claim 1, wherein in the region of the sliding and displacement face of the slide there is disposed a groove on one of the slide and main body for the reception of a circumferential sealing ring, which groove embraces the substrate plates in all displacement positions of the slide.

26. The tool head as claimed in claim 25, wherein the sealing ring is configured as a scraper ring means for scraping the lubricating oil away from the slide when the slide is displaced.

27. The tool head as claimed in claim 1, wherein the substrate plate having the measuring scale is disposed on the side of the slide and the substrate plate having the sensor is disposed on the side of the main body.

28. The tool head as claimed in claim 1, wherein the slide is displaceable by means of an externally operated drawbar aligned axially in the main body.

29. The tool head as claimed in claim 28, wherein the drawbar has as transmission means with at least one helical gearing for engaging in a helical gearing of the slide and is complementary thereto.

30. The tool head as claimed in claim 28, wherein in the main body there is disposed a further equalizing slide, which is displaceable jointly with the first slide, by the drawbar, in a direction opposing the displacement of the first slide.

31. The tool head as claimed in claim 1, wherein the evaluating electronics are connected by an optoelectronic transmitter-receiver for data exchange, which transmitter-receiver is disposed in a peripheral ring of the tool head, to an external transmitting-receiving device.

32. The tool head as claimed in claim 31, further comprising a CNC-control system connected to the external transmitting-receiving device and to a drive mechanism for the drawbar, for moving and positioning the slide.

33. The tool head as claimed in claim 31, wherein the evaluating electronics are disposed in the peripheral ring, which consists of light metal.

34. The tool head as claimed in claim 33, wherein a circumferential metal foil is disposed between the peripheral ring and the main body.

35. The tool head as claimed in claim 31, wherein the peripheral ring is clamped between a flange cover and an annular shoulder of the main body, circumferential sealing rings disposed on both sides of the peripheral ring being clamped in-between the flange cover and the annular shoulder respectively.

36. The tool head as claimed in claim 1, wherein the evaluating electronics are battery-operated.

37. The tool head as claimed in claim 1, characterized by an inductive energy-transfer and data-transfer path between the measuring and evaluating electronics and an external control and evaluating device.

38. The tool head as claimed in claim 37, wherein the energy-transfer and data-transfer path has a tool-fixed rotor coil and a machine-fixed stator coil.

39. The tool head as claimed in claim 37, wherein the slide is adjustable within the tool head by means of an electric motor, which is powered via the inductive energy-transfer path and is disposed in the tool head.

40. The tool head as claimed in claim 5, wherein the scanning head is clamped in place in a bearing plate fastened to one of the main body and working slide and, together with the bearing plate, is pivotable and adjustable, in relation to the substrate plate configured as the measuring scale, about an axis running perpendicular to the plane of the substrate plate.

* * * * *

UNITED STATES PATENT AND TRADEMARK OFFICE
CERTIFICATE OF CORRECTION

PATENT NO. : 5 655 422
DATED : August 12, 1997
INVENTOR(S) : Gerhard STOLZ et al It is certified that error appears in the above-indentified patent and that said Letters Patent is hereby corrected as shown below:

Column 10, line 2; after "connected" insert ---to---.

Column 10, lines 9 and 10; delete "relation to an adjacent sliding and displacement plane of the".

Signed and Sealed this

Tenth Day of February, 1998

*Attest:*

BRUCE LEHMAN

*Attesting Officer*    *Commissioner of Patents and Trademarks*